United States Patent [19]

Noddings et al.

[11] 3,963,091

[45] June 15, 1976

[54] SPEED CONTROL DEVICES

[75] Inventors: John Noddings; Norman Hunt, both of Leamington Spa, England

[73] Assignee: Associated Engineering Limited, England

[22] Filed: Mar. 3, 1975

[21] Appl. No.: 554,513

[30] Foreign Application Priority Data
Mar. 5, 1974 United Kingdom.............. 9914/74

[52] U.S. Cl. ............................ 180/108; 123/97 R; 180/105 E
[51] Int. Cl.² ....................................... B60K 31/00
[58] Field of Search ........................... 180/105–109; 123/97, 98

[56] References Cited
UNITED STATES PATENTS

| | | | |
|---|---|---|---|
| 2,737,165 | 3/1965 | Thorner............................. | 180/108 |
| 3,070,185 | 12/1962 | Fales.................................. | 180/108 |
| 3,081,837 | 3/1963 | Fiteny................................ | 180/108 |
| 3,126,078 | 3/1964 | Novotny ......................... | 180/108 X |
| 3,557,898 | 1/1971 | Emery................................ | 180/108 |

*Primary Examiner*—M. H. Wood, Jr.
*Assistant Examiner*—Terrance L. Siemens
*Attorney, Agent, or Firm*—Brisebois & Kruger

[57] ABSTRACT

This invention relates to a speed control system which is operable to maintain a vehicle at a selected speed, or to prevent the vehicle speed dropping below the selected speed. The system includes an electrically-operable pressure control valve which is arranged to be fed with fluid from a source of fluid pressure, for example from the transmission oil pump of an automatic transmission system, an electronic control circuit having a memory in which a selected vehicle speed can be set by the driver, and which supplies a control signal in the form of a variable mark/space ratio pulse train representative of the difference between the actual and selected speeds, to the electrically operable control valve. Fluid pressure from the pump is applied to the smaller working area side of a displaceable differential piston of a differential area piston arrangement, and the larger working area side of the differential piston is connected to the output side of the control valve. The control valve is modulated by the variable control signal to correspondingly vary the pressure applied to the larger area side of the differential piston, and correspondingly displace the piston. The piston is connected by a linkage arrangement to the vehicle engine to control the latter in order to maintain said selected vehicle speed. Means are provided, between the driver-operated accelerator pedal and the engine, to permit driver control of the engine to be overridden by the system.

17 Claims, 5 Drawing Figures

SPEED CONTROL DEVICES

The present invention relates to a vehicle speed control device, and a system incorporating such a device.

It is often desirable to pre-set the speed of a vehicle such as a road vehicle or boat leaving the driver free to concentrate on steering his vehicle. This is particularly the case with road vehicles under motorway driving conditions.

According to the present invention there is provided a vehicle speed control device, comprising; an electrically-operable pressure control valve arranged to be fed with fluid from a source of fluid pressure; an electronic control circuit having a memory in which a selected vehicle speed can be set and which is arranged to supply a signal representative of the difference between the actual and selected speeds to the electrically-operable control valve; a differential area piston arrangement, to the smaller working area side of the differential piston of which the fluid source pressure is arranged to be fed, and to the greater area side of the differential piston of which the output pressure of the control valve is arranged to be supplied; and means connectable between the differential piston of the differential piston arrangement and the engine of the vehicle, the position of the piston being used to control the vehicle engine in order to maintain said selected vehicle speed.

According to a different aspect of the invention there is provided a system for enabling a vehicle to maintain a selected vehicle speed which system comprises; an electrically-operable pressure control valve arranged to be fed with fluid from a source of fluid pressure; an electronic control circuit having a memory in which a selected vehicle speed can be set and which is arranged to supply a signal, representative of the difference between the actual and selected speeds, to the electrically-operable control valve; a differential area piston arrangement to the smaller working area side of the differential piston of which the fluid source pressure is fed, and to the greater working area side of the differential piston of which the output pressure of the control valve is supplied; and means coupled between the differential piston and the vehicle engine, the position of the piston being used to control the vehicle engine in order to maintain said selected vehicle speed.

The invention is particularly suited to vehicles fitted with an automatic transmission system when the source of fluid pressure is conveniently the transmission pump of the automatic gearbox. Where a vehicle does not have an automatic transmission system the source of fluid pressure may be a power steering pump or the engine oil pump.

Preferably the vehicle engine is controlled by controlling the quantity of fuel supplied to an engine fuel-delivery device. The fuel delivery device for the engine may be a fuel distribution pump in the case of a diesel engine, or a carburettor throttle valve in the case of a petrol engine.

The invention will now be further described by way of example with reference to the accompanying drawings, in which.

Figure 1:
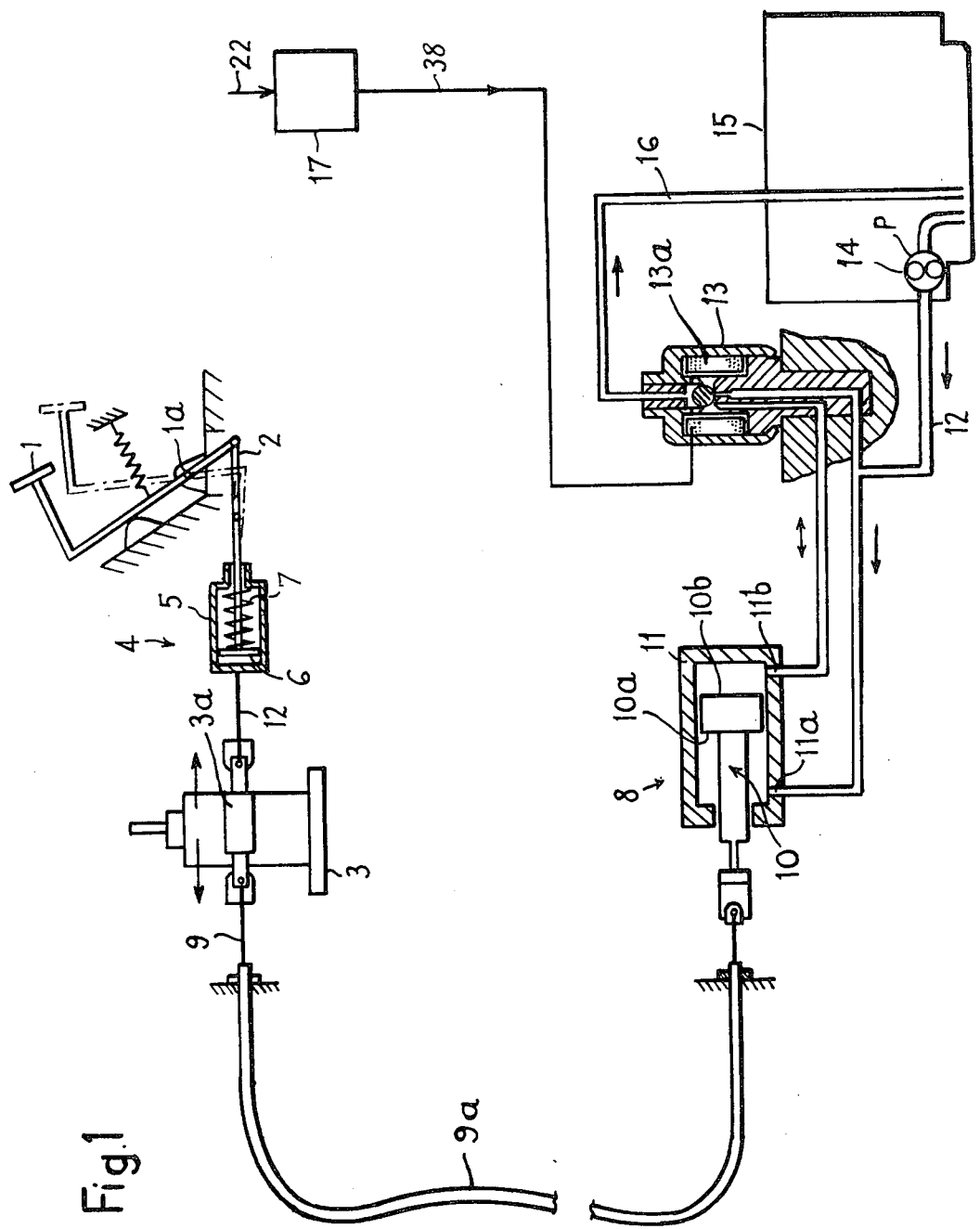
FIG. 1 is a diagrammatic layout of a system incorporating a speed control device according to a first embodiment of the invention, and suitable for vehicle speed control with top speed inhibit.

In the embodiment of FIG. 1 the accelerator pedal of a vehicle such as a road vehicle, is designated 1, the closed and open positions of the accelerator pedal being shown in broken and full lines respectively. The accelerator pedal 1 (or throttle lever mechanism when the device is used under testbed conditions) is pivoted at 1a, and is connected by a throttle linkage 2 to the control linkage 3a of a diesel engine fuel distribution pump 3 through a lost motion, collapsible spring link arrangement generally shown at 4. The link arrangement 4 includes a cylindrical housing 5 within which a flange 6 is slidably received in the manner of a piston. The flange 6 is biased to the left, as viewed in FIG. 1, by means of a compression spring 7. It will be appreciated that the housing 5 may be displaced to the left, as viewed, relative to the flange 6, against the action of the spring 7, so that collapsible spring link arrangement 4 will allow the full throttle position of the driver's foot on the accelerator pedal 1 to be overridden.

The fuel distribution pump 3 is connected through the linkage 2 to the housing 5. The other side of the distribution pump is connected to a differential piston arrangement 8 through a flexible Bowden cable 9, the outer sheath of which is designated 9a. The piston arrangement 8 includes a differential area piston 10, having one face 10a of less working area than the other face 10b. The piston 10 is reciprocable within a cylinder 11 having two fluid inlet ports 11a and 11b. Hydraulic fluid under pressure is fed directly from an input hydraulic conduit 12, via the port 11a, to the piston face 10a. The input conduit 12 is also indirectly connected to the port 11b and piston face 10b via a pressure control valve 13. The input conduit 12 is supplied with hydraulic fluid under pressure, for example, by the transmission oil pump 14 of the vehicle's automatic transmission or gearbox 15.

The pressure control valve 13 may, for example, be an electromagnetic solenoid-operated ball valve of the type described with reference to FIGS. 2 or 3 of Applicant's copending British Patent Application No: 1962/72, and reference should be made to that application for a full description of the valve. The valve, when de-energized, connects the input conduit 12 to the port 11b, and when energized, shuts off this connection and vents or connects the port 11b to the transmission 15 on the low pressure side of the pump 14, via the return conduit 16.

An electrical signal from an electronic control circuit 17 is fed to the solenoid 13a of the pressure control valve 13. The signal is preferably in the form of a train of electrical pulses, the mark/space ratio of which is dependent upon vehicle speed, and determined by the amount by which the vehicle speed differs from a constant speed desired and pre-set by the driver. One form of suitable control circuit 17 may be obtained from that described in Applicant's copending British Patent Application No: 2156/74, and will be described below in brief.

Figure 2:
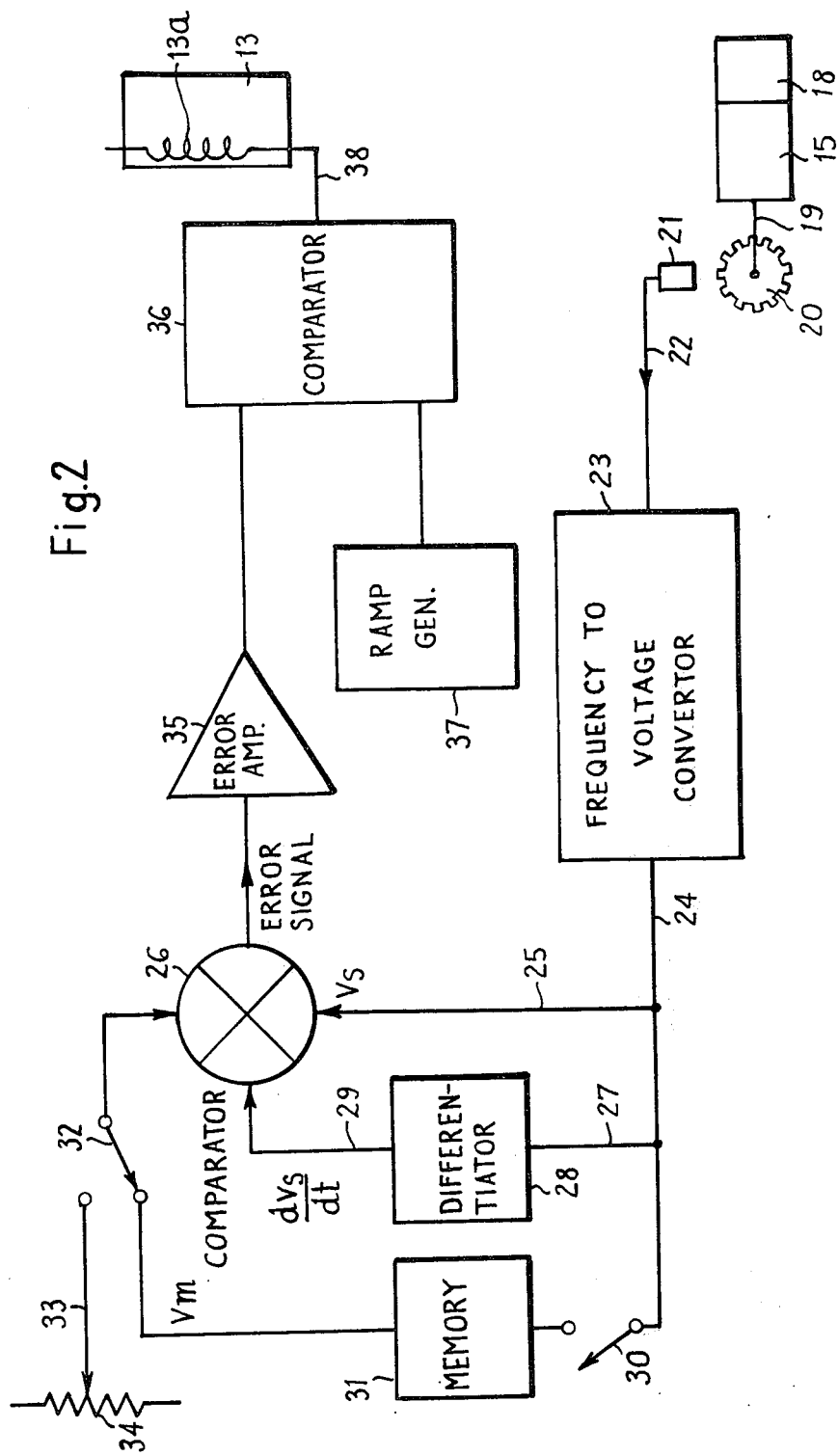
FIG. 2 is a block diagram of one form of electronic control circuit suitable for use in the system of FIG. 1.
Figure 3:
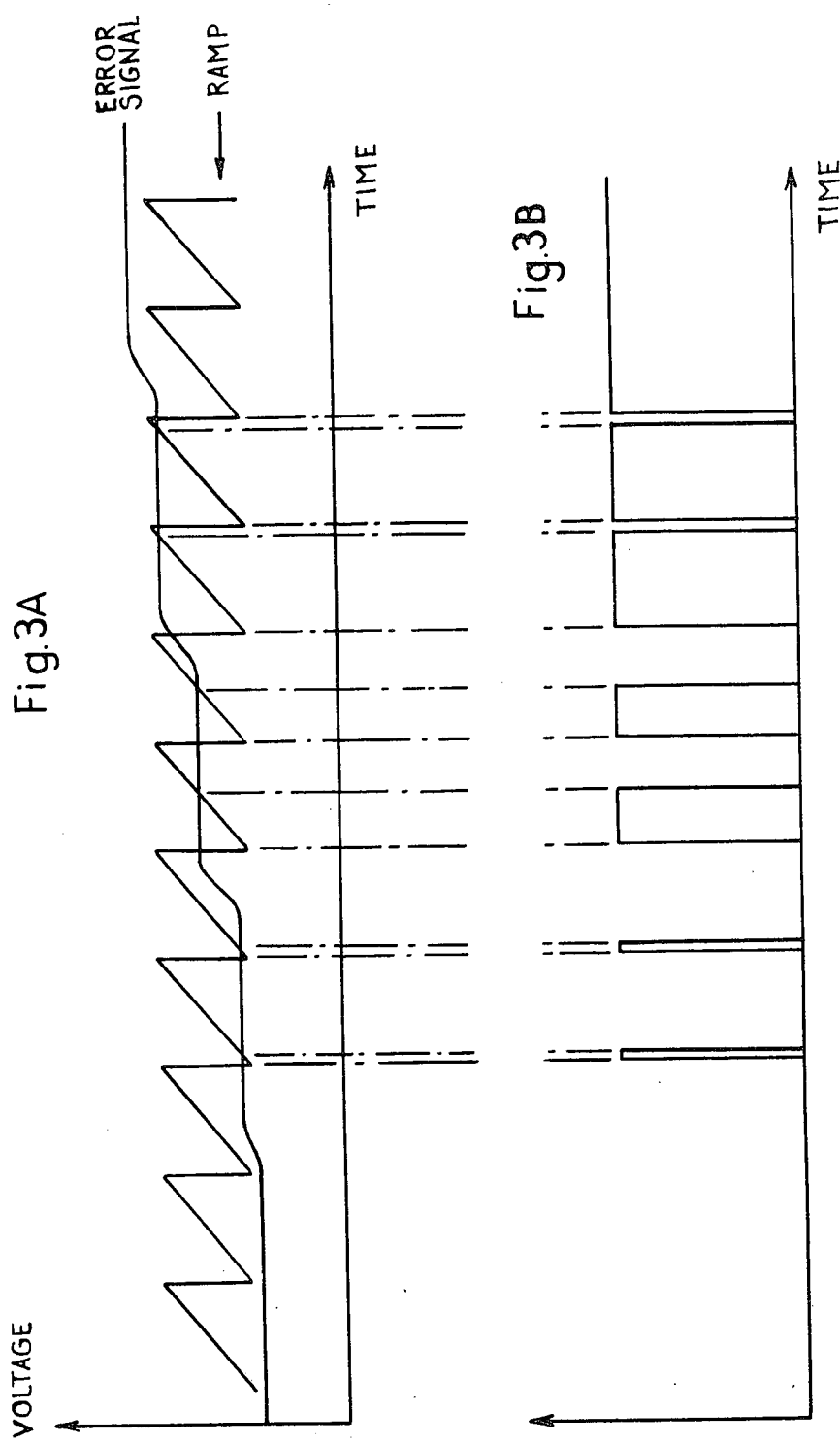
FIG. 3A is a plot of voltage against time for the ramp error signals generated in the circuit of FIG. 2.
FIG. 3B shows the pulses of variable mark/space ratio as derived from FIG. 3A, and applied to the electromagnetic pressure control valve of FIG. 1, or FIG. 4.

In FIG. 2, the transmission 15, coupled to the vehicle power unit or engine 18, drives a rotatable output shaft 19 to which is fastened a ferrous-toothed disc or wheel 20. Adjacent the toothed wheel is an inductive transducer 21 of the kind which emits an electrical pulse as each tooth on the wheel 20 passes the transducer. Alternatively, suitable pulses may be obtained from the contact breaker of the engine ignition system if the engine is a petrol engine. Each pulse passes along a line 22 to a frequency-to-voltage converter circuit 23 which emits an electrical feedback signal $V_S$, which is proportional to pulse frequency, along a line 24. The signal $V_S$ in line 24 is fed by a line 25 as one input Vs to a comparator 26. The signal V is also fed by a line 27 to a differentiator 28 whose output signal dVs/dt is proportional to the rate of change of signal $V_S$ and is fed by a line 29 as a further input to the comparator 26.

In addition, the signal $V_S$ is fed through a set-memory switch 30 to an electrical memory circuit 31 which may either be an analogue or a digital memory. The circuit 31 maintains an output signal which is equal to the value of the signal $V_S$ whenever the switch 30 is momentarily closed. The output signal of memory circuit 31 is fed as a third input signal Vm into the comparator 26 through a switch 32. Alternatively, Vm can be derived, for example, from the slider 33 of a potentiometer 34 connected across a suitable supply voltage and fed to the comparator 26 through the switch 32 in its other position. The voltage from slider 33 represents a desired preset speed.

The comparator 26 processes the three signals which are fed to it and produces an error signal which is fed to an error amplifier 35, the output of which is connected to one input terminal of a further comparator 36. A ramp generator 37, generating a ramp pulse frequency of between 10 to 50 Hz, typically 20 Hz, is connected to the other input terminal of the comparator 36.

The operation of the comparator 36 will be described with reference to FIGS. 3A and 3B. As can be seen, the comparator 36 compares the ramp and error signals (FIG. 3A) so as to produce an output in the form of a plurality of substantially constant frequency pulses, whose mark/space ratio varies in dependence upon the magnitude of the error signal (FIG. 3B). Thus when the magnitude of the error voltage is less than that of the lower extremities of the ramp voltage, then no pulses are provided, as may be seen from the left side of FIGS. 3A and 3B. When the error voltage lies within the amplitude of the ramp waveform, pulses of variable mark/space ratio are produced as may be seen from the central section of FIGS. 3A and 3B. When the error voltage lies above the peak amplitude of the ramp waveform, then pulses of infinite mark/space ratio are produced, as seen from the right side of FIGS. 3A and 3B.

The output of the comparator 36 is fed via the line 38 to the solenoid 13a of the electromagnetic pressure control valve 13 (shown diagrammatically in FIG. 2).

In use, a vehicle driver takes his vehicle up to a speed, for example 50 m.p.h., which he wishes to maintain constant. He then operates a control to open switch 30 and thereby sets and stores the desired constant speed in the memory 31. This switching also causes the comparator 36 to emit pulses to the electromagnetic pressure control valve 13. At this time, the signal Vm from memory 31 is equal to the feedback signal Vs applied to the comparator 26, so that the error signal fed to comparator 36 through the error amplifier 35 is set at a position corresponding with the mid-position of the amplitude excursion of the ramp signal. Accordingly the mark/space ratio of the output pulses from comparator 36 is unity. These pulses of unit mark/space ratio modulate the valve 13 so that the mean fluid pressure acting on the face 10b of the differential piston 10 in FIG. 1 is less than that in the line 12 and applied to the piston face 10a. Depending upon the design of the valve 13, the valve may respond to the individual electrical pulses, or alternatively to the average or integrated value of these pulses.

In the set speed condition, with the vehicle travelling at 50 m.p.h., the different pressures acting on the two piston faces 10a and 10b are effectively balanced out by the differential areas of the piston faces, and the differential piston 10 remains at some intermediate predetermined axial position within its cylinder 11 without overriding the setting of the distributor pump linkage 3a determined by the accelerator pedal 1.

After setting the desired constant speed in the memory 31, the driver depresses the vehicle accelerator pedal (or engine throttle lever) to the maximum throttle setting and maintains the accelerator pedal in that position. The vehicle speed may rise initially as the control circuit takes up full control, any increase in speed being a function of the rate at which the driver moves the accelerator to the maximum position. After the system has settled and takes full control, however, the vehicle speed returns to, and does not differ substantially from, the desired constant speed.

If the vehicle speed then changes from 50 m.p.h., owing, for example, to the vehicle encountering a gradient, or to an alteration in the position of the accelerator pedal and therefore the distributor pump linkage 3a, a different signal is transmitted to the pressure control valve 13.

In particular, if the speed has risen beyond 50 m.p.h., the error signal fed to comparator 36 is caused to change to a level or value which is such as to give a smaller pulse width. This modulates the pressure control valve 13 to reduce the average energization time thereof, i.e. increase the average time during which the valve is vented via the line 16. This in turn reduces the pressure on piston face 10b, causing piston 10 to move to the right, as viewed to FIG. 1, to progressively move the distribution pump linkage 3a to the left and close the distribution pump 3. This movement is not affected by the accelerator pedal due to the provision of the spring link arrangement 4. This movement reduces the quantity of fuel available to the engine until the vehicle speed again falls to 50 m.p.h.

Similarly, if the speed has fallen below 50 m.p.h., the error signal fed to the comparator 36 is caused to change to a value or level so as to produce a wider pulse width, which will, in turn, modulate the pressure control valve 13 to increase the average energization time thereof, i.e. reduce the average time during which the valve is vented. Thus, the pressure on the piston face 10b is increased, moving the piston 10 to the left and the linkage 3a to the right, as viewed, hence increasing the quantity of fuel available to the engine so that the vehicle speed again rises to 50 m.p.h.

The use of a control circuit 17, such as that previously described, which produces a signal in the form of a train of electrical pulses, the mark/space ratio of which is varied in dependence upon the difference of the vehicle from 50 m.p.h., is particularly convenient. The pulsed nature of the control pressure on the piston face 10b also helps to minimise the effects of friction or hysteresis on the differential piston movement. Any speed may be selected as the predetermined speed up to a fixed maximum speed which is built into the electronics and which is not adjustable by the driver. This feature is particularly useful when applied to commercial vehicles, because it enables the vehicle's owner to select a maximum speed which the driver cannot readily override.

When the driver wishes to switch the device off he may either depress the switch 13, which may be mounted on or controllable from his dashboard, or alternatively comprise a micro-switch fitted, for example, to the footbrake or accelerator pedal, which automatically disengages the device when the footbrake is depressed or the accelerator pedal released.

Figure 4:
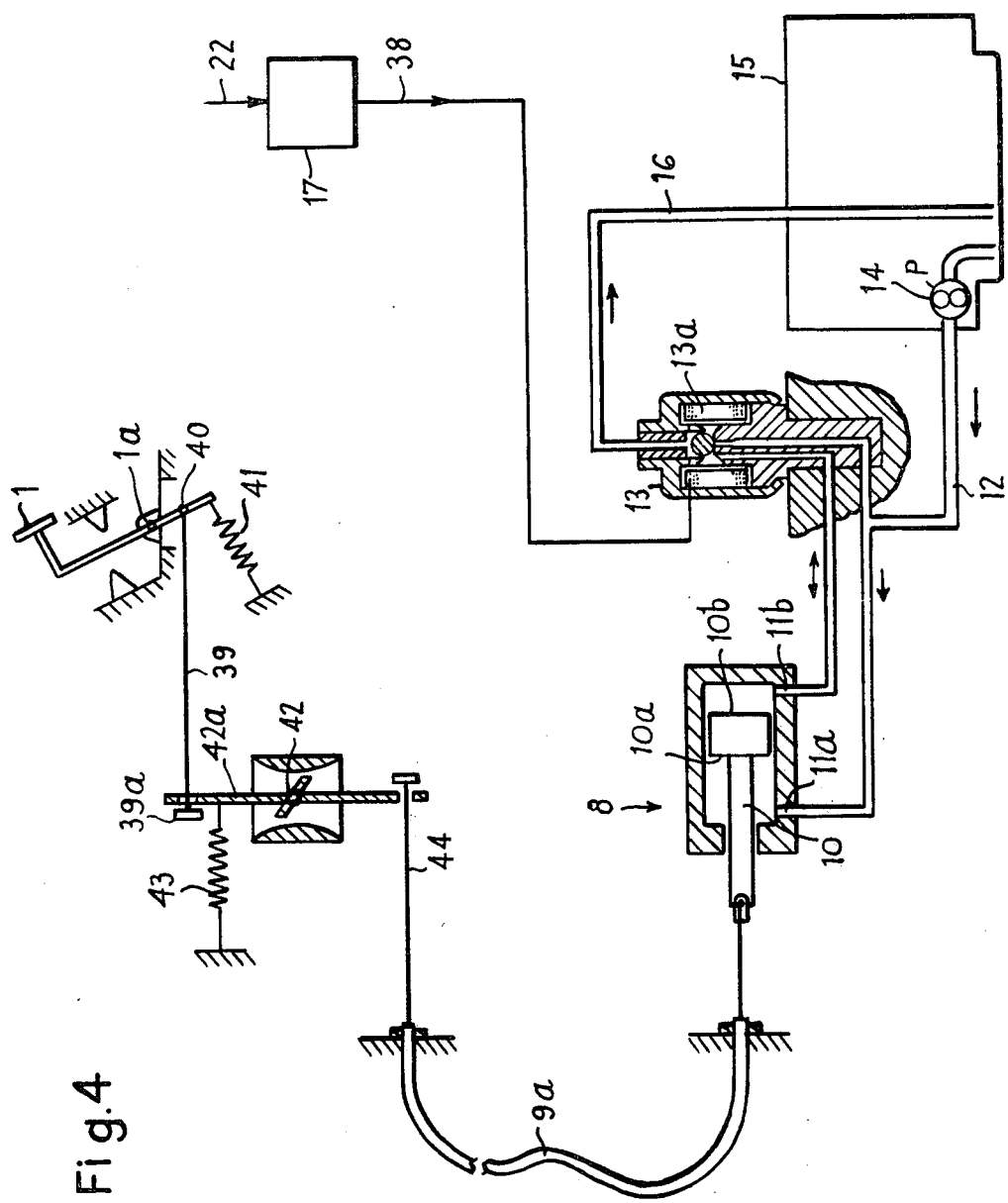
FIG. 4 is a diagrammatic layout of a system incorporating a device according to a second embodiment of the invention, and suitable for use as a speed controller only.

The embodiment of FIG. 4 is also suitable for use with vehicles both on the road and also under test-bed conditions. In the embodiment of FIG. 4 similar reference numerals have been used to designate similar parts to those of FIG. 1. The difference between the embodiments of FIGS. 1 and 4 is that, in the embodiment of FIG. 4 there is no set maximum speed position. The maximum obtainable speed is that of which the vehicle is inherently capable. The driver may also, if required, override the control setting to overtake another vehicle for example. The direction of pull of the piston assembly is in the opposite direction to that of the embodiment of FIG. 1.

The accelerator pedal 1 is pivotably mounted at 1a and a flexible linkage 39, such as a cable, is attached, for example is pivotably mounted, to the pedal at 40. A spring 41 normally biases the pedal clockwise from the position shown to the fully closed position.

The throttle spindle 42 of a carburettor has a lever 42a connected to it, and the spindle is normally biased to its closed position by a spring 43. The flexible linkage 39 is slidably received in an aperture in the lever 42a, and a stop 39a on the end of the linkage 39 prevents the linkage from coming free from the lever 42a, and allows the linkage 39 to pull open the throttle by means of the pedal 1.

The other end of the lever 42a is provided with another aperture through which passes one end of a further flexible linkage 44, for example the flexible cable of a Bowden cable having an outer sheath 9a. The other end of the flexible linkage 44 is connected to the differential piston 10.

The automatic gearbox or transmission 15 and the control circuit 17 operate in similar manner to the same parts described with respect to FIGS. 1, 2, 3A and 3B.

When the accelerator pedal 1 is depressed the linkage 39 opens the throttle against the action of spring 43. When not in use the control or differential piston 10 is biased to the left hand position as viewed from the position shown enabling full movement of the carburettor spindle to be obtained by means of the linkage 39, since the flexible linkage 44 will simply slide through the aperture in lever 42a. The accelerator pedal 1 is used to take the vehicle up to the required minimum speed, say 50 m.p.h. The switch 30 (FIG. 2) is then opened e.g. a button is pressed, which sets and stores the speed in the memory 31 and the piston 10 is moved to the right as viewed until the linkage 44 takes up control of the lever 42a. At this point the driver releases the accelerator pedal 1, allowing the flexible linkage 39 to slide through the aperture in the lever 42a. The vehicle is now under automatic control. If the speed deviates from the set position, the piston 10 is progressively moved in the required direction to correct the error by modulating the pressure on face 10b via the modulated pressure control valve 13. At a constant speed the linkage 39 is free, but biased to the left, as viewed in FIG. 4, by the spring 41. Hence, when the driver wishes to exceed the preset speed, for example to overtake another vehicle, he can simply depress the accelerator pedal when the speed control device is overridden.

It will be appreciated that, when a vehicle is not fitted with an automatic transmission system, a power steering pump or engine oil pump may be used as a source of fluid pressure in place of the pump 14. Alternatively the vehicle may be fitted with separate pump specifically for the speed control device.

Whilst the speed control device has been described with respect to vehicles, it may equally be applied to boats or hovercraft for example, when a set speed is to be maintained.

We claim:

1. A system for enabling a vehicle to maintain a selected vehicle speed, which system comprises; an electrically-operable pressure control valve arranged to be fed with fluid from a source of fluid pressure; an electronic control circuit having a memory in which a selected vehicle speed can be set and which is arranged to supply a signal, representative of the difference between the actual and selected speeds, to the electrically-operable control valve; a differential area piston arrangement, to the smaller working area side of the differential piston of which the fluid source pressure is fed, and to the greater working area side of the differential piston of which the output pressure of the control valve is supplied; and means coupled between the differential piston and the engine of the vehicle, the position of the piston being used to control the vehicle engine in order to maintain said selected vehicle speed.

2. A system as claimed in claim 1, wherein the differential area piston arrangement comprises a cylinder, a differential area piston axially slidable within the cylinder, a first fluid inlet port in the cylinder communicating with the smaller working area side of the piston, and a second fluid inlet port in the cylinder communicating with the greater working area side of the piston, a first fluid conduit being connected to the first inlet port and to the fluid pressure source, and a second fluid conduit being connected to the second inlet port and the control valve.

3. A system as claimed in claim 2, including a linkage arrangement connected to the differential piston and operable to transmit relative displacement between the piston and its cylinder to a control linkage of a fuel delivery device of the engine, to control the supply of fuel to the engine.

4. A system as claimed in claim 3, wherein the linkage arrangement comprises a mechanical linkage connected to the control linkage of the engine fuel delivery device.

5. A system as claimed in claim 4, wherein the linkage arrangement controls both increases and decreases in the supply of fuel by the engine fuel delivery device.

6. A system as claimed in claim 5, including override means connected between the engine fuel delivery device and driver-operable speed control means of the vehicle to enable said linkage arrangement to override the driver-operable means so as to permit both increases and decreases in the actual speed set by the driver-operable means, towards the selected speed.

7. A system as claimed in claim 6, wherein said override means comprises a collapsible spring link arrangement connected to and between the control linkage of the engine fuel delivery device and the driver-operable means.

8. A device as claimed in claim 4, wherein the linkage arrangement limits the level of the minimum supply of fuel by the engine fuel delivery device.

9. A system as claimed in claim 8, including override means connected between the engine fuel delivery device and driver-operable speed control means of the vehicle to enable said linkage arrangement to override the driver-operable means so as to permit an increase in the actual speed set by the driver-operable means towards the selected speed, whilst allowing the driver-operable means to override the control effect of the differential area piston arrangement for actual speeds above the selected speed.

10. A system as claimed in claim 9, wherein said override means includes a lost-motion arrangement connected between the driver-operable means and control linkage of the engine fuel delivery device, a lost-motion arrangement also being provided, connected between the linkage arrangement and said control linkage.

11. A system as claimed in claim 2, wherein the control valve includes a fluid inlet port, first and second fluid outlet ports, and a valve member actuable by the electronic control circuit to selectively connect the first outlet port to the inlet port and to the second outlet port, the inlet port being connected by a third fluid conduit to the fluid pressure source, the first outlet port being connected by the second fluid conduit to the second inlet port of the differential area piston arrangement and the second outlet port being connected by a fourth fluid conduit to a zone at a lower pressure than that of the fluid pressure source.

12. A system as claimed in claim 11, wherein energization of the control valve by the electronic control circuit is operable to interconnect the first and second outlet ports of the control valve, and de-energization of the control valve is operable to interconnect the inlet and first outlet ports of the control valve.

13. A system as claimed in claim 12, wherein the electronic control circuit is operable to supply to the control valve, a control signal comprising a train of electrical pulses, the mark/space ratio of which is dependent upon the difference between the actual and selected speeds.

14. A system as claimed in claim 13, wherein the electronic control circuit is operable to produce pulses of constant frequency and of a width variable over a range between zero width and a continuous signal, the mark/space ratio being changeable, from a mark/space ratio approximating unity at the selected speed, in a direction to increase the pulses width upon a drop in the actual speed below the selected speed, and in a direction to decrease the pulse width upon an increase in the actual speed above the selected speed.

15. A system as claimed in claim 14, wherein the fluid pressure source comprises a fluid pressure pump of the vehicle, the first inlet port of the differential piston arrangement and the inlet port of the control valve being connected to the high pressure outlet side of the pump, and the second outlet port of the control valve being connected to the low pressure inlet side of the pump.

16. A system as claimed in claim 15, wherein the vehicle is provided with an automatic transmission, and said pump comprises the oil pump of said transmission.

17. A vehicle speed control device, comprising; an electrically-operable pressure control valve arranged to be fed with fluid from a source of fluid pressure; an electronic control circuit having a memory in which a selected vehicle speed can be set and which is arranged to supply a signal representative of the difference between the actual and selected speeds to the electrically-operable control valve; a differential area piston arrangement, to the smaller working area side of the differential piston of which the fluid source pressure is arranged to be fed, and to the greater area side of the differential piston of which the output pressure of the control valve is arranged to be supplied; and means connectable between the differential piston of the differential piston arrangement and the engine of the vehicle, the position of the piston being used to control the vehicle engine in order to maintain said selected vehicle speed.

* * * * *